(12) United States Patent
Lazarev

(10) Patent No.: US 7,132,138 B2
(45) Date of Patent: Nov. 7, 2006

(54) LIQUID CRYSTAL INFORMATION DISPLAYS

(75) Inventor: Pavel I. Lazarev, Belmont, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/006,166

(22) Filed: Dec. 4, 2001

(65) Prior Publication Data

US 2002/0105608 A1 Aug. 8, 2002

(30) Foreign Application Priority Data

Dec. 6, 2000 (RU) .............................. 2000130482

(51) Int. Cl.
*G02F 1/21* (2006.01)

(52) U.S. Cl. .................. 428/1.3; 428/1.1; 428/1.31; 349/97; 349/105; 349/162; 349/165; 349/194; 359/491

(58) Field of Classification Search ........ 428/1.1–1.31; 349/123, 139, 165, 97, 194, 105, 162; 359/437, 359/491
See application file for complete search history.

(56) References Cited

U.S. PATENT DOCUMENTS

| | | | |
|---|---|---|---|
| 2,700,919 A * | 2/1955 | Boone ......................... | 359/498 |
| 4,422,730 A | 12/1983 | Kozaki et al. | |
| 4,674,840 A | 6/1987 | Bennett | |
| 4,719,152 A * | 1/1988 | Ohta et al. .................. | 428/432 |
| 5,712,024 A * | 1/1998 | Okuzaki et al. ......... | 428/195.1 |
| 5,739,296 A * | 4/1998 | Gvon et al. ................. | 534/577 |
| 5,764,001 A * | 6/1998 | Khan et al. ................. | 313/582 |
| 6,124,912 A | 9/2000 | Moore | |
| 6,147,726 A * | 11/2000 | Kubota et al. ................ | 349/74 |

FOREIGN PATENT DOCUMENTS

| | | |
|---|---|---|
| EP | 0 006 566 A | 1/1980 |
| EP | 0 604 903 A2 | 6/1994 |
| JP | 10-228015 | 8/1998 |
| JP | 2001-517329 T | 10/2001 |
| KR | 1992-0001280 | 2/1992 |
| RU | 2120651 C1 | 10/1998 |
| RU | 2140094 C1 | 10/1999 |
| RU | 2140663 C1 | 10/1999 |
| RU | EP0961138 A1 * | 12/1999 |
| RU | 2147759 C1 | 4/2000 |
| WO | WO9931535 | 6/1999 |
| WO | WO 02/063660 A1 | 8/2002 |

OTHER PUBLICATIONS

English Translation by Schreiber Translations of KR 1992-0001280.*

(Continued)

*Primary Examiner*—Harold Pyon
*Assistant Examiner*—Sow-Fun Hon
(74) *Attorney, Agent, or Firm*—Dorsey & Whitney LLP

(57) ABSTRACT

The LC information display contains a layer of liquid crystal situated between the front and the rear panels with functional layers, and the liquid crystal has parameters providing interference maximum or minimum of transmission or reflection at the exit of the display and/or at the boundary of at least two functional layers and/or between the LC layer and a functional layer, for at least one linearly polarized component of light, and for at least one wavelength.

The disclosed invention allows optimizing transmission of light through optically anisotropic functional layers of the display, which leads to substantial increase of its effectiveness.

15 Claims, 1 Drawing Sheet

OTHER PUBLICATIONS

Sergan, T., et al., "Polarizing-alignment layers for twisted nematic cells", *Liquid Crystals*, Taylor and Francis Ltd., London, GB, vol. 27, No. 5, 2000, pp. 567-562.

Broer, Dirk J. et al., "*In-Situ Photopolymerization of an Oriented Liquid-Crystalline Acrylate*", Philips Research Laboratories, Professor Eindhoven, Makromol, Chem, 189, 1988, pp. 185-194, no month.

Lub, J. et al., "*The Formation of a Liquid Crystalline Main Chain Polymer by Means of Photopolymerization*", Philips Research Laboratories, Professor Holstlann 4, Liquid Crystals, 1998, vol. 24, No. 3, pp. 375-379, no month.

Sergan, Tatiana. et al., "*Polarizing-Alignment Layers for Twisted Nematic Cells*", Liquid Crystals, 2000, vol. 27, No. 5, pp. 567-572, no month.

* cited by examiner

LIQUID CRYSTAL INFORMATION DISPLAYS

RELATED APPLICATIONS FOREIGN PRIORITY

This application claims priority to Russian Federation Application No. RU 2000130482 filed Dec. 6, 2000.

BACKGROUND

1. Field

The invention pertains to information displays, in particular to liquid crystal displays, and can be used in the indication devices of various function, as well as in optical modulators, matrix systems of light indication, etc.

2. Description of the Related Art

There are known liquid crystal information displays, implemented as a flat cell formed by two parallel glass plates, on the internal sides of which there are electrodes made out of optically transparent electrically conducting material, for example indium dioxide or tin oxide. The internal surface of the plates with electrodes undergoes a special processing to align the liquid crystal material. After assembling the cell, it is filled with liquid crystal, which forms a layer of 5–20 µm, which constitutes the active medium which changes its optical properties (the angle of rotation of the polarization plane) under the influence of electric field. The change of optical properties is registered in the cross-oriented polarizers, which are affixed on the outer surfaces of the cell.

The general drawback of devices of this kind is low brightness, low contrast and quite high energy consumption. The structure of other known displays comprises large number of layers of substantial thickness, which have substantially different refraction coefficients. In each of these there are substantial losses of light due to absorption, as well as due to reflection at the boundary between the layers. In addition, the known devices have limited viewing angle.

The closest prior art is the liquid crystal information displays implemented as a flat cell comprising two flat parallel plates forming the display panels. The characteristic of the known displays is the substantial simplification of design due to fewer layers used in the display, the decrease of their thickness, the possibility of using internal polarizers and the possibility of incorporating the functions of several layers in a single layer. Thus for example, a layer of polarizer obtained from oriented supramolecular complexes of a dichroic dye and formed on the internal surface of the panel can simultaneously serve the function of the polarizer itself as well as the function of liquid crystal alignment layer; and besides the technology of obtaining this kind of layers implies obtaining very thin films of high quality and high optical characteristics.

The drawback of the known displays is their low brightness and low contrast, which is due to the absence of optical coordination of all elements in the system, which leads to substantial losses.

SUMMARY

The object of the invention is to provide an information display which features optical coordination of all or at least several functional elements (layers) of the multi-layered structure with the purpose of optimization of light transmission through the device.

Technical result of the claimed invention is an increase of brightness and contrast of an image, especially for the light traveling normal to the display's surface, decrease of thickness and simplification of display design by optimization of all or at least several functional layers and elements of the display and by combining several functions in a single layer, lowering losses and enhancing optical characteristics of the display. Use of the claimed invention allows optimizing transmission of light through optically isotropic and anisotropic functional layers of the display, which leads to substantial increase of its effectiveness.

BRIEF DESCRIPTION OF THE DRAWINGS

The foregoing and other objects of the invention will be more clearly understood from the following description when read in conjunction with the accompanying drawings of which.

DESCRIPTION OF THE PREFERRED EMBODIMENTS

Figure 1:
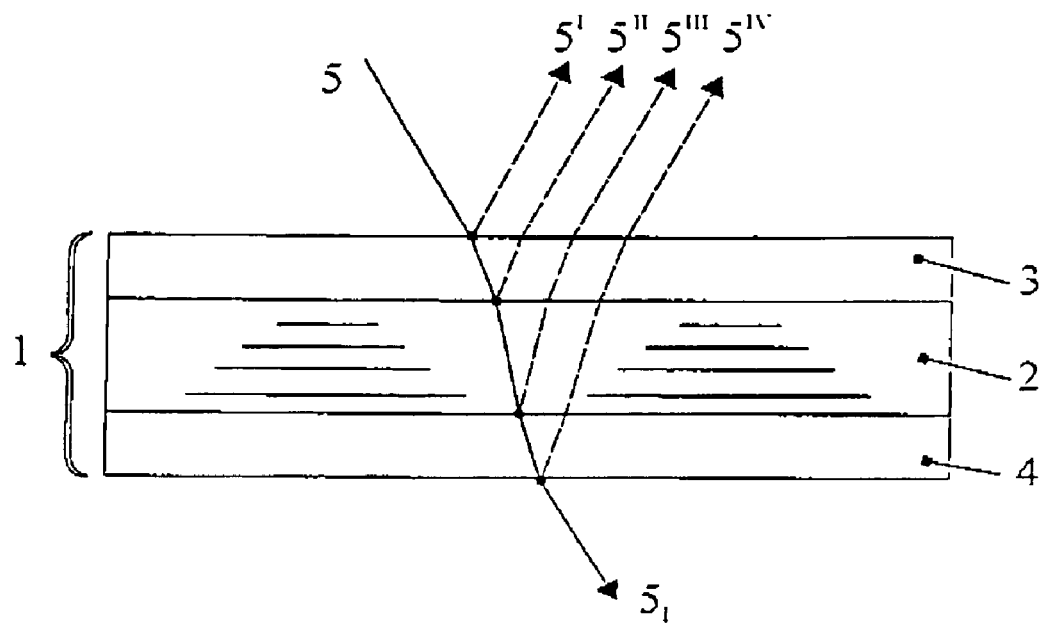
FIG. 1 schematically illustrates the general principles of operation of a liquid crystal display.

FIG. 1 represents a structure with at least one liquid crystal layer 2 which changes its optical characteristics upon the application of an external electrical field. The device contains polarizers 3 and 4, and may contain other functional elements or layers. A beam of light 5 incident on the boundary between the layers with different refractive indices splits into a beam $5_1$ which is transmitted through the layers and beams $5^I$, $5^{II}$, $5^{III}$ and $5^{IV}$ reflected at the boundaries of materials having different refractive indices. With the selection of optical properties and thickness of each functional layer (considering the two states of the liquid crystal material with and without applied electric field) one can achieve reduction of light of one polarization while enhancing light of the other polarization.

Technical result of the invention is achieved by the fact that in the liquid crystal information display, containing a layer of liquid crystal between the front and the rear panels with the functional layers. The layer of liquid crystal has the parameters providing interference maximum or minimum of transmission or reflection at the exit of the display and/or at the boundary of at least two functional layers, and/or at the boundary between the liquid crystal layer and a functional layer, for at least one linearly polarized component of light, and for at least one wavelength. In the capacity of the functional layers, the display may contain at least one layer of polarizer and/or at least one electrode layer and/or at least one alignment layer and/or at least one planarization layer and/or at least one retarder layer and/or at least one anti-reflective layer and/or at least one light-reflecting layer and/or at least one color filter layer and/or at least one protective layer and/or at least one layer simultaneously functioning as at least two of the above listed layers. At least one electrode layer and/or at least one alignment layer and/or at least one planarization layer and/or at least one anti-reflective layer and/or at least one light-reflecting layer and/or at least one color filter layer and/or at least one layer simultaneously functioning as at least two of the above listed layers may be anisotropic. Interference maximum or minimum of transmission or reflection at the exit of the display and/or at the boundary of at least two functional layers can be provided with and/or without the presence of voltage bias on the electrode layer. Optical thickness of at least one functional layer can provide the interference maximum or minimum of transmission or reflection at the exit of the display and/or at the boundary of at least two functional layers and/or elements. The number and parameters of all layers in the display may be coordinated in order to provide the interference maximum or minimum of transmission or reflection at the exit of the display. At least one polarizer may be implemented as the internal one. At least one optically anisotropic layer may be an oriented film of organic dye of the formula:

{K}(M)n, where, K—the dye, chemical formula of which contains ionogenic group or groups, same or different, which provide its solubility in polar solvents in order to form the lyotropic liquid-crystal phase, M—anti-ion, n—the amount of anti-ions in the dye molecule, which may be a fraction in the case when one anti-ion belongs to several molecules, and in the case when n>1 anti-ions may be different. At least one optically anisotropic layer may be a crystalline film.

Electromagnetic wave incident on the boundary between two mediums is divided into the wave transmitted into the second medium and the wave reflected from the boundary. For liquid crystal information displays, radiation reflected at the boundaries between functional layers will constitute a loss leading to worsening of the quality of a display. The fraction of energy in the reflected wave will be determined by the ratio of the refraction coefficients of the two mediums. In a complicated device with large number of layers having substantially different refraction coefficients, the losses of energy due to reflection may reach substantial amounts. Besides that, for the reflective liquid crystal displays, radiation reflected from the boundaries between the functional layers will lead to glare, which will substantially worsen displaying contrast.

With the choice of optical thickness of each functional layer (optical difference of travel in reflected rays) one can attain the effect of "anti-reflection", where the interference of the reflected rays will lead to an increase of the fraction of energy of the transmitted light.

Since liquid crystal display is optically anisotropic, i.e. sensitive to the chosen polarization of light, optimization of the display, the choice of the layers' optical thickness should be performed for each direction of polarization. Besides that, liquid crystal display has two substantially different states: with and without the presence of voltage bias on the electrodes. Therefore, liquid crystal information displays can be considered as polarization-phase multi-layer display with a dynamic element (liquid crystal). Calculation of optical thickness and the sequence of layers is performed using known algorithms. Since the known algorithms are applicable for isotropic systems, while the system includes optically anisotropic layers, during calculation of parameters for anisotropic layers using the known algorithms one uses corresponding refraction coefficients for each polarization state—open and closed state of liquid crystal. Two values of optical thickness are determined for each layer. The required value of optical thickness of each layer is determined from the obtained interval. Effectiveness of the device is used as the criteria for optimization of the optical thickness.

EXAMPLE OF EMBODIMENT

Let us consider, for example, a transmissive liquid crystal display. It consists of two plates, which can be made out of glass, plastic or other transparent material. On the internal surface of these plates facing the layer of nematic liquid crystal, one applies transparent electrodes. Over the transparent electrodes one applies polarizing films of polymer or other material, which smooth out the relief and give the entire surface of the plate uniform properties. Polarizing coatings are applied onto these films with their optical axes oriented mutually perpendicular. The polarizing coatings align the molecules of nematic liquid crystal. The plates and functional layers define panels on each side of the liquid crystal material.

For the purpose of color compensation in an liquid crystal display with super twist nematic (STN), one additionally introduces an optically anisotropic layer with a predetermined optical thickness situated on the second plate.

Figure 2:
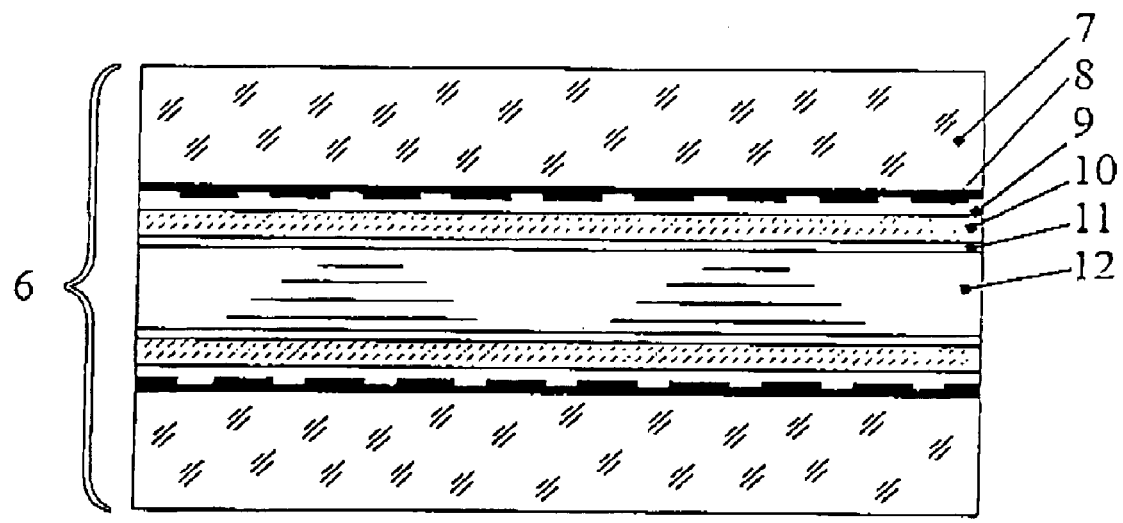
FIG. 2 is a cross-sectional view of a transmission display in accordance with one embodiment of the present invention.

FIG. 2 is a cross-sectional view of a display in accordance with one embodiment of the present invention. The display's layer's materials and thickness are selected to provide maximum brightness and contrast of the displayed image. Referring to the Figure, the positioning of the functional layers in the display is symmetrical relative to the liquid crystal layer 12. In one embodiment, the display cell had spaced parallel glass plates 7 having a thickness of 1.1 mm and refractive index n=1.5, layers of ITO material 8 with thickness of 0.08 µm and refractive index n=1.85, transparent layers of $SiO_2$ 9 with thickness of 0.1 µm and refractive index n=1.75, optically anisotropic layers 10 which are aligned films of blue-violet composition in the weight ratio of 3.2 (Optiva, Inc., 377 Oyster Point Blvd., #13, South San Francisco, Calif. 94080 V017) with thickness of 0.4 µm and having optical parameters $n_o$=1.91, $n_c$1.48, $k_0$0.722, films of polyimide 11 with thickness of 0.04 µm and refractive index n=1.52 and the layer of liquid crystal material (MLC-6806-000 twisted by 240°

Besides that, one could introduce additional layers into the display, optically isotropic or anisotropic to provide the interference maximum or minimum of transmission or reflection at the exit of the display. This could be the anti-reflective coating of the surface of the plates, as well as thin films between functional layers. Using anisotropic layers obtained from solutions of dichroic dyes capable of forming lyotropic liquid crystal phase in the capacity of polarizers and retarder films allows obtaining films with thickness of 0.6–1.2 micrometers. The layer of liquid crystal may be chosen to be 1–10 micrometers thick. Calculation of the number of layers in the display and the choice of materials (optical parameters) for each layer is performed using known algorithms for calculating multi-layer interference systems. It is preferred that parameters of the system allow maximum transmission when there is no voltage bias on the electrodes and minimum transmission when there is a voltage bias applied.

In order to enhance spectral characteristics of the display, the amount of layers is increased, which leads to an increase of over-all thickness of the display.

Calculation and design of the reflective liquid crystal display, which provides interference maximum or minimum of transmission or reflection at the exit of the display, are performed analogously to the above. In the reflecting variant of the display the second plate can be made out of transparent as well as non-transparent material. Light-reflecting layer, for example aluminum mirror, is then formed on it. The film of aluminum can simultaneously be the continuous electrode. Using photolithography one can etch aluminum to obtain narrow lines 10–100 micrometers wide along the desired path in order to obtain electrodes of the desired configuration. Polarizing coating is applied directly on the reflecting coating or the planarization layer.

The invention claimed is:

1. A liquid crystal information display comprising
a front panel of functional layers facing an observer,
a rear panel of functional layers opposite the front panel, and
a layer of liquid crystal material twisted by 240° between the front and rear panels of functional layers, wherein the layer of liquid crystal material has parameters providing at least one interference maximum or minimum of transmission or reflection for at least one linearly polarized component of incident beam of light at at least one wavelength reflected or transmitted at the exit of the front panel, the parameters being achieved at least in the state of the liquid crystal material with applied electric field, said parameters comprise thickness, optical thickness, ordinary refractive index, extraordinary refractive index, and the ratio of ordinary refractive index to extraordinary refractive index, wherein the thickness is in a range of from 1 μm to 10 μm.

2. A liquid crystal information display according to claim 1, wherein in the capacity of functional layers the display contains at least one layer of polarizer and/or at least one electrode layer and/or at least one alignment layer and/or at least one planarization layer and/or at least one retarder layer and/or at least one anti-reflective layer and/or at least one light-reflecting layer and/or at least one color filter layer and/or at least one protective layer and/or at least one layer simultaneously functioning as at least two of the above listed layers.

3. A liquid crystal information display according to claim 2, wherein at least one functional layer of the group comprising electrode layer, alignment layer, planarization layer, anti-reflective layer, light-reflecting layer, and color filter layer is anisotropic.

4. A liquid crystal information display according to claim 3, wherein the interference maximum or minimum of transmission for the reflected or transmitted light at the exit of the front panel is provided with and/or without voltage bias on the electrode layer.

5. A liquid crystal information display according to claim 4, wherein at least one polarizer is an internal one.

6. A liquid crystal information display according to claim 4, wherein at least one optically anisotropic layer is an oriented film of organic dye of the formula:

{K}(M)n, where K—the dye, chemical formula of which contains ionogenic group or groups, same or different, which provide its solubility in polar solvents in order to form lyotropic liquid-crystal phase, M—the anti-ion, n—the number of anti-ions in the dye molecule, which may be a fraction when one anti-ion belongs to several molecules, and in the case when n>1 the anti-ions may be different.

7. A liquid crystal information display according to claim 3, wherein at least one polarizer is an internal one.

8. A liquid crystal information display according to claim 7, wherein at least one optically anisotropic layer is an oriented film of organic dye of the formula:

{K}(M)n, where K—the dye, chemical formula of which contains ionogenic group or groups, same or different, which provide its solubility in polar solvents in order to form lyotropic liquid-crystal phase, M—the anti-ion, n—the number of anti-ions in the dye molecule, which may be a fraction when one anti-ion belongs to several molecules, and in the case when n>1 the anti-ions may be different.

9. A liquid crystal information display according to claim 3, wherein at least one optically anisotropic layer is an oriented film of organic dye of the formula:

{K}(M)n, where K—the dye, chemical formula of which contains ionogenic group or groups, same or different, which provide its solubility in polar solvents in order to form lyotropic liquid-crystal phase, M—the anti-ion, n—the number of anti-ions in the dye molecule, which may be a fraction when one anti-ion belongs to several molecules, and in the case when n>1 the anti-ions may be different.

10. A liquid crystal information display according to claim 3 wherein at least one optically anisotropic layer is a crystalline film.

11. A liquid crystal information display according to claim 1 or 2, wherein the interference maximum or minimum of transmission for the reflected or transmitted light at the exit of the front panel is provided with and/or without voltage bias on the electrode layer.

12. A liquid crystal information display according to claim 11, wherein at least one polarizer is an internal one.

13. A liquid crystal information display according to claim 11, wherein at least one optically anisotropic layer is an oriented film of organic dye of the formula:

{K}(M)n, where K—the dye, chemical formula of which contains ionogenic group or groups, same or different, which provide its solubility in polar solvents in order to form lyotropic liquid-crystal phase, M—the anti-ion, n—the number of anti-ions in the dye molecule, which may be a fraction when one anti-ion belongs to several molecules, and in the case when n>1 the anti-ions may be different.

14. A liquid crystal information display according to claim 1 or 2, wherein at least one polarizer is an internal one.

15. A liquid crystal information display according to claim 14, wherein at least one optically anisotropic layer is an oriented film of organic dye of the formula:

{K}(M)n, where K—the dye, chemical formula of which contains ionogenic group or groups, same or different, which provide its solubility in polar solvents in order to form lyotropic liquid-crystal phase, M—the anti-ion, n—the number of anti-ions in the dye molecule, which may be a fraction when one anti-ion belongs to several molecules, and in the case when n>1 the anti-ions may be different.

* * * * *